(12) United States Patent
Menachem et al.

(10) Patent No.: US 11,088,966 B2
(45) Date of Patent: Aug. 10, 2021

(54) MANAGING CONGESTION IN A NETWORK ADAPTER BASED ON HOST BUS PERFORMANCE

(71) Applicant: MELLANOX TECHNOLOGIES, LTD., Yokneam (IL)

(72) Inventors: Adi Menachem, Hod Hasharon (IL); Alex Shpiner, Nesher (IL); Noam Bloch, Bat Shlomo (IL); Eitan Zahavi, Zichron Yaakov (IL); Idan Burstein, Carmiel (IL); Dror Bohrer, Nesher (IL); Roee Moyal, Yokneam Illit (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 0 days.

(21) Appl. No.: 16/672,682

(22) Filed: Nov. 4, 2019

(65) Prior Publication Data
US 2020/0145349 A1 May 7, 2020

Related U.S. Application Data

(60) Provisional application No. 62/756,085, filed on Nov. 6, 2018.

(51) Int. Cl.
*H04L 1/00* (2006.01)
*H04L 12/931* (2013.01)
(Continued)

(52) U.S. Cl.
CPC ........ *H04L 49/505* (2013.01); *H04L 47/2408* (2013.01); *H04L 49/3018* (2013.01); *H04L 49/501* (2013.01); *H04L 49/9068* (2013.01)

(58) Field of Classification Search
CPC .............. H04L 49/505; H04L 47/2408; H04L 49/3018; H04L 49/501; H04L 49/9068
See application file for complete search history.

(56) References Cited

U.S. PATENT DOCUMENTS 7,035,220 B1 * 4/2006 Simcoe .................. H04L 47/10
370/236
9,444,754 B1 * 9/2016 Noureddine ............ H04L 47/31
(Continued)

OTHER PUBLICATIONS

PCI Express Base Specification, revision 3.0, pp. 1-860, Nov. 10, 2010.
(Continued)

*Primary Examiner* — Abdelnabi O Musa
(74) *Attorney, Agent, or Firm* — Kligler & Associates Patent Attorneys Ltd

(57) ABSTRACT

A network adapter includes a host interface and circuitry. The host interface is configured to connect locally between the network adapter and a host via a bus. The circuitry is configured to receive from one or more source nodes, over a communication network to which the network adapter is coupled, multiple packets destined to the host, and temporarily store the received packets in a queue of the network adapter, to send the stored packets from the queue to the host over the bus, to monitor a performance attribute of the bus, and in response to detecting, based at least on the monitored performance attribute, an imminent overfilling state of the queue, send a congestion notification to at least one of the source nodes from which the received packets originated.

18 Claims, 2 Drawing Sheets

(51) Int. Cl.
*H04L 12/861* (2013.01)
*H04L 12/851* (2013.01)
*H04L 12/935* (2013.01)

(56) References Cited

U.S. PATENT DOCUMENTS

| | | | |
|---|---|---|---|
| 2005/0088969 A1* | 4/2005 | Carlsen | H04L 49/30 370/229 |
| 2014/0143455 A1* | 5/2014 | Hayut | G06F 3/016 710/19 |
| 2016/0062442 A1 | 3/2016 | Burstein et al. | |
| 2018/0191617 A1* | 7/2018 | Caulfield | H04L 47/11 |

OTHER PUBLICATIONS

"Supplement to InfiniBandTM Architecture Specification", vol. 1, Release 1.2.1, Annex A16: RDMA over Converged Ethernet (RoCE), InfiniBand Trade Association, pp. 1-19, Apr. 6, 2010.

Postel et al., "Internet Control Message Protocol", DARPA Internet Program Protocol Specification, Request for Comments 792, pp. 1-21, Sep. 1981.

\* cited by examiner

MANAGING CONGESTION IN A NETWORK ADAPTER BASED ON HOST BUS PERFORMANCE

CROSS-REFERENCE TO RELATED APPLICATIONS

This application claims the benefit of U.S. Provisional Patent Application 62/756,085, filed Nov. 6, 2018, whose disclosure is incorporated herein by reference.

TECHNICAL FIELD

Embodiments described herein relate generally to communication networks, and particularly to methods and systems for controlling congestion in a network adapter.

BACKGROUND

A network node typically connects to a communication network via a network adapter, which temporarily stores packets received from the communication network in a receive buffer. Methods aiming to prevent the receive buffer from overfilling are known in the art. For example, U.S. Pat. No. 9,444,754 describes congestion detection implemented on the ingress direction, egress direction, or both directions in a network interface controller. Congestion notification is facilitated between a source and a destination through a network interface controller. In accordance with an aspect, a NIC is configured to label ingress packets from the network in relation to the presence of congestion. In accordance with another aspect, the NIC is configured to label egress packets that are going to the network in relation to the presence of congestion. A full offload NIC is equipped to operate on the packet labels in the presence of congestion and to react appropriately if it is on the receiving end, sending end, or both.

U.S. Patent Application Publication 2016/0062442 describes a method for processing data. The method includes receiving in a peripheral device, which is connected by a bus to a host processor having host resources, a notification of a sleep state of at least one of the host resources. While the at least one of the host resources is in the sleep state, when the peripheral device receives data from a data source for delivery to the host processor, the peripheral device sends a message to the data source, which causes the data source to defer conveying further data to the peripheral device until the at least one of the host resources has awakened from the sleep state.

SUMMARY

An embodiment that is described herein provides a network adapter that includes a host interface and circuitry. The host interface is configured to connect locally between the network adapter and a host via a bus. The circuitry is configured to receive from one or more source nodes, over a communication network to which the network adapter is coupled, multiple packets destined to the host, and temporarily store the received packets in a queue of the network adapter, to send the stored packets from the queue to the host over the bus, to monitor a performance attribute of the bus, and in response to detecting, based at least on the monitored performance attribute, an imminent overfilling state of the queue, send a congestion notification to at least one of the source nodes from which the received packets originated.

In some embodiments, the performance attribute includes a transaction latency between a time of sending a read request over the bus and a time of receiving a response to the read request over the bus, and the circuitry is configured to detect the imminent overfilling state by identifying that the transaction latency exceeds a predefined latency limit. In other embodiments, the bus supports a credit-based flow control scheme, the performance attribute includes a credit level available for transmitting data toward the host over the bus, and the circuitry is configured to detect the imminent overfilling state by identifying that the credit level is below a predefined credit threshold. In yet other embodiments, the received packets belong to multiple different respective service classes, and the circuitry is configured to detect the imminent overfilling state for a selected service class.

In an embodiment, the circuitry is configured to detect the imminent overfilling state based on evaluating a rate of change of the performance attribute. In another embodiment, the circuitry is configured to send the congestion notification by generating a multibit notification that indicates a severity level of the performance attribute. In yet another embodiment, the circuitry is configured to initially store the received packets in a receive buffer of the network adapter, to process at least some of the packets in the receive buffer before transferring the received packets to the queue, and to detect the imminent overfilling state based on respective occupancy levels of at least one of the queue and the receive buffer, and on the monitored performance attribute.

In some embodiments, the circuitry is configured to send the congestion notification using a notification packet supported by an underlying transport layer protocol. In other embodiments, the circuitry is configured to send the congestion notification to a given source network node only when a predefined time period has elapsed since a congestion notification was previously sent to the given source network node.

There is additionally provided, in accordance with an embodiment that is described herein, a method, including, in a network adapter including a host interface for connecting locally between the network adapter and a host via a bus, receiving from one or more source nodes, over a communication network to which the network adapter is coupled, multiple packets destined to the host, and temporarily storing the received packets in a queue of the network adapter. The stored packets are sent from the queue to the host over the bus. A performance attribute of the bus is monitored. In response to detecting, based at least on the monitored performance attribute, an imminent overfilling state of the queue, a congestion notification is sent to at least one of the source nodes from which the received packets originated.

These and other embodiments will be more fully understood from the following detailed description of the embodiments thereof, taken together with the drawings in which:

DETAILED DESCRIPTION OF EMBODIMENTS

Overview

Figure 1:
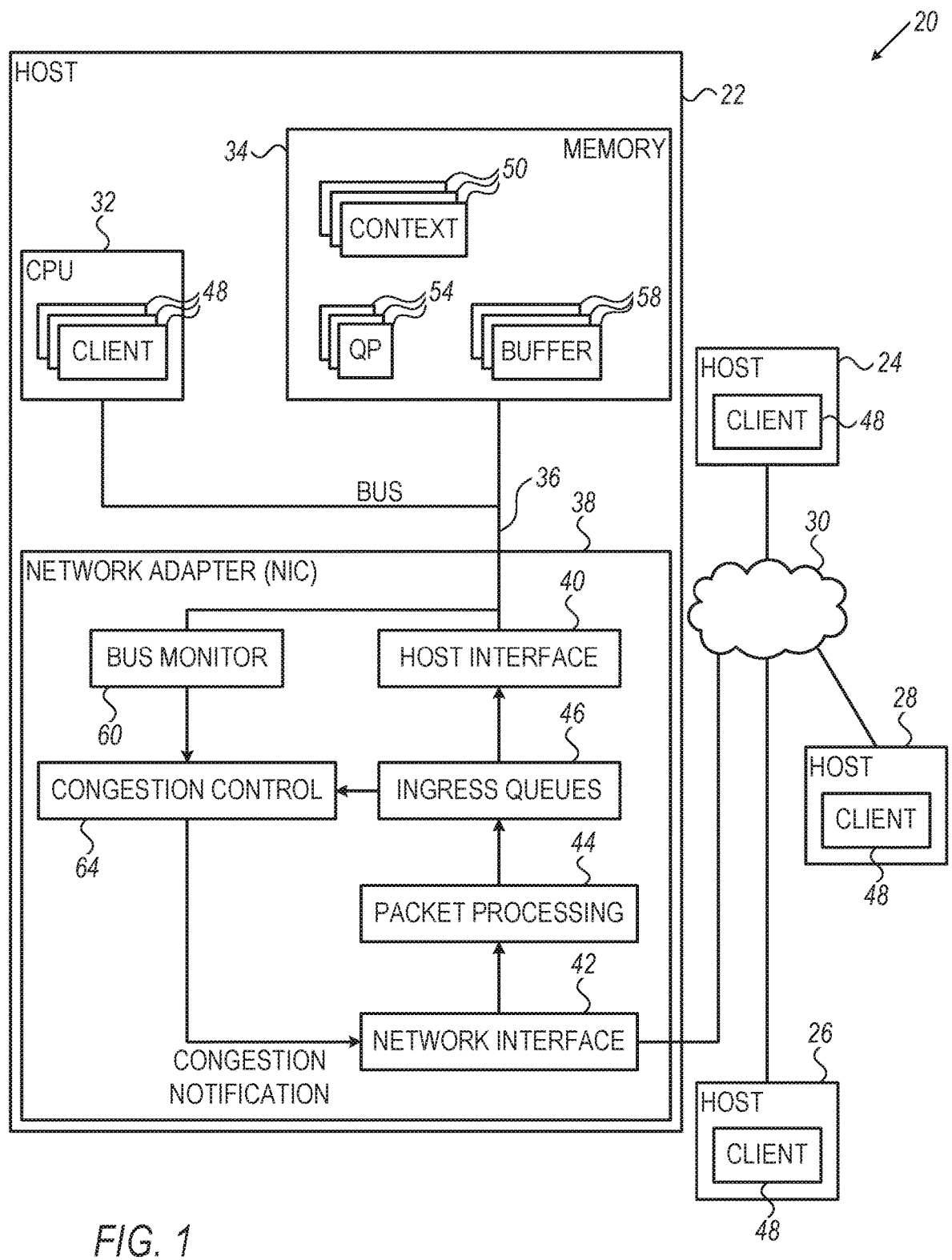
FIG. 1 is a block diagram that schematically illustrates a computer system 20 in which congestion control is based on monitoring host bus performance, in accordance with an embodiment that is described herein.

Embodiments that are described herein provide methods and systems for managing congestion in a network adapter coupled locally via a bus to a host in a network node. An imminent overfill state of ingress queues in the network adapter is detected based on certain performance attributes of the bus. In the embodiments disclosed below an assumption that the network adapter is coupled to the host via a Peripheral Component Interconnect Express (PCIe) bus, is generally made. Alternatively, however, any other suitable bus or link between the network adapter and host can also be used.

When an ingress queue of the network adapter fills with data of incoming packets at a higher rate than its emptying rate toward the host, the ingress queue may become overfilled or congested. In communication networks in which packets are not allowed to be dropped, an overfilled queue may create back-pressure toward the network, which may result in spreading the congestion to network elements (e.g., switches or routers) upstream, thus degrading the network utilization considerably. In communication networks that allow packet dropping, e.g., under congestion conditions, dropped packets are typically retransmitted end-to-end, thus degrading the network performance.

The ingress queue at the network adapter may overfill, for example, due to a high filling rate, low emptying rate, or both. For example, high-rate data flows (e.g., data flows containing multimedia content) may fill the ingress queue at a rate higher than its emptying rate. As another example, the host may not be able to accept data from the network adapter, over the local PCIe bus, at a sufficient rate.

In some embodiments, the network adapter monitors certain performance attributes of the PCIe bus that is used for transferring the data to the host. The network adapter uses the monitored PCIe bus performance attributes for predicting whether the ingress queues are expected to overfill. For example, slow bus responsivity indicates that the emptying rate toward the host is limited, which may result in congestion if the situation persists. Deciding on imminent congestion is typically based on the occupancy levels of the ingress queues, in addition to the bus performance attributes.

In an embodiment, in response to detecting an imminent overfilling state of the queue, the network adapter sends a suitable congestion notification, over the network, to at least one of the source nodes from which the received packets originated. The congestion notification instructs the relevant source network node(s) to reduce the rate of data transmission into the communication network, in order to relieve congestion at the destination network node that has sent the notification.

In some embodiments, the bus performance attribute comprises a transaction time-latency from initiating a read request over the bus by the network adapter, until a time of receiving a response to this read request over the bus by the network adapter. In these embodiments, long time-latencies (e.g., longer than a predefined latency period) may indicate an imminent congestion. In other embodiments, the performance attribute comprises a flow-control credit level available for transmitting data toward the host over the bus. In such embodiments, a low credit level may indicate an imminent overfilling state of the ingress queues. In some embodiments, the network adapter detects the imminent overfilling state in the queue with respect to packets belonging to a selected service class. The network adapter may detect the imminent congestion state based on the rate of change of the bus performance attribute instead of or in addition to the value of that performance attribute.

In some embodiments, the network adapter stores incoming packets in a hierarchy of buffers. For example, the received packets are initially stored in a receive buffer, and at a later time are processed and transferred to the ingress queues. In such embodiments, in detecting an imminent overfilling state, the network adapter takes into consideration the occupancy level of the receive buffer, the occupancy levels of the ingress queues, or both.

The network adapter may notify the congestion to a relevant source node(s) in various ways. For example, the network adapter may generate the notification by calculating a multibit indication of the severity level of the bus performance attribute(s). In an embodiment, the network adapter sends the congestion notification using a notification packet supported by an underlying transport layer protocol, such as a Congestion Notification Packet (CNP) of the Remote Direct Memory Access (RDMA) over Converged Ethernet (RoCE) protocol, or using a Congestion Notification Message (CNM) in InfiniBand.

Host bus performance is uniquely visible to the network adapter of the destination network node. Using the disclosed techniques, the network adapter exploits the visibility it has regarding the local host bus performance, to detect imminent congestion, and reacts fast to notify the imminent congestion to the source node. These congestion control capabilities cannot be implemented within network elements such as switches or routers.

System Description

FIG. 1 is a block diagram that schematically illustrates a computer system 20 in which congestion control is based on monitoring host bus performance, in accordance with an embodiment that is described herein.

Computer system 20 comprises a host computer 22, (also referred to as a host or a host device) that communicates with other host computers 24, 26 and 28 over a communication network 30. In the present example, at least one of host computers 24, 26 and 28 send packets to host computer 22, i.e., serving as a source node for host computer 22. Host computer 22 comprises a Central Processing Unit (CPU) 32 and a memory 34, which are connected by a suitable bus 36. A network adapter 38 connects host computer 22 to communication network 30 such as an Ethernet or InfiniBand (IB) switch fabric. Network adapter 38 may comprise, for example, a Network Interface Controller (NIC) or an IB Host Channel Adapter (HCA).

Network adapter 38 comprises a network interface 42, which is coupled to communication network 30, and a host interface 40, which connects locally to CPU 32 and to memory 34 via bus 36. Packets received from the communication network via network interface 42 are processed using a packet processing module 44, which stores the processed packets in ingress queues 46 before the network adapter transmits the processed packets to CPU 32 or to host memory 34 via host interface 40 and bus 36.

In some embodiments, the network adapter stores the received packets in a hierarchy of buffers. For example, the network adapter may initially store incoming packets in a receive buffer (not shown) and later process the packets in the receive buffer and transfer them to ingress queues 46.

Network adapter 38 handles transport layer communication with peer network adapters (not shown) of remote host computers 24, 26 and 28 using multiple transport service instances, referred to herein as Queue Pairs (QPs) 54, in accordance with IB convention. Each QP 54 comprises a Send Queue (SQ) and a Receive Queue (RQ) (not shown). (Alternatively, in Ethernet parlance, transport service instances may be referred to as rings.) In some embodiments, RQs may be shared among multiple QPs, and packets on the same QP may be directed to different RQs depending on payload data content.

Memory 34 typically holds a context 50 for each QP 54 so that the context information can be accessed by network adapter 38 and by software running on CPU 32. Additionally or alternatively, context information may be stored in network adapter 38 or in other dedicated memory.

Network adapter 38 and software processes, e.g., client processes 48 running on CPU 32 exchange data by writing to and reading from buffers 58 in memory 34.

Packet processing module 44 (or other logic in the network adapter) writes the packet payload data of packets queued in ingress queues 46 to appropriate locations in host memory 34, e.g., in one of buffers 58. The memory location for a given packet may be indicated by a corresponding Work Queue Element (WQE) in the SQ part of the respective QP (when the packet contains a RDMA read response), in the RQ part of the respective QP (when the packet contains a SEND request) or by the packet header itself (when the packet contains a RDMA write request). After writing the payload data to memory 34, packet processing module 44 writes a Completion Queue Element (CQE) to a Completion Queue (CQ) (not shown). The CQ number for each QP is recorded in QP context 50, and multiple QPs may share the same CQ.

Bus 36 may comprise any suitable bus or link. In the present example, bus 36 comprises a Peripheral Component Interconnect Express (PCIe) fabric, which is specified, for example, in "PCI Express Base Specification," revision 3.0, Nov. 10, 2010. In some embodiments, host computer 22, CPU 32 and memory 34 interconnect to bus 36 via a Root Complex (RC) (not shown), and network adapter 38 serves as a PCIe device or endpoint coupled to the PCIe fabric.

Network adapter 38 comprises a bus monitor 60, which monitors various performance attributes of bus 36 to be used in detecting congestion. In some embodiments, a performance attribute comprises the latency incurred in a read operation initiated by the network adapter. The read operation may target, for example, a context 50, a WQE in one of QPs 54, or some data in a buffer 58, of memory 34. The read operation may also target a PCIe device (not shown) coupled to the PCIe fabric.

To estimate the bus latency, bus monitor 36 measures the time elapsing between transmitting a read request by the network adapter toward the RC, and receiving the requested data back in the network adapter. A long latency indicates that bus 36 may be congested, or that the element to which the read request was targeted (e.g., CPU 32 or a PCIe device) operates in a slow mode. In general, long latency over bus 36 (e.g., longer than a predefined latency period) may result in congestion in ingress queues 46, because queued data cannot be transmitted to the host at a sufficiently high speed.

In some embodiments, a performance attribute of bus 36 relates to flow control credits of the data link layer of the PCIe protocol. In these embodiments, the bus monitor counts the PCIe credits available for writing data towards the RC. A low credit count may be caused when the receiving party at the other side of the PCIe link has no sufficient storage for the data to be written.

A congestion control module 64 uses the attributes monitored by bus monitor 60, and typically also the occupancy levels of ingress queues 46, for deciding whether a congestion state in ingress queues 46 is imminent. Upon detecting an imminent congestion state, congestion control module 64 generates a suitable congestion notification for sending over communication network 30 to one or more source nodes suspected to cause the congestion. The congestion notification indicates to the source network node(s) to reduce the rate of injecting data to the network so as to relieve the congestion detected at the destination node. Bus monitor 60 and congestion control module 64 will be described in detail further below.

In describing host 22 and network adapter 38 we refer mainly to ingress direction in which packets are received from the network, and the egress direction is omitted for the sake of clarity. In practice, however, the network adapter typically stores packets to be transmitted to the network in one or more egress queues (not shown). For example, the congestion notification may be stored in an egress queue for transmission to communication network 30, or sent to the communication network directly via network interface 42.

The configurations of communication network 30, host computer 22 and network adapter 38 shown in FIG. 1 are example configurations, which are chosen purely for the sake of conceptual clarity. In alternative embodiments, any other suitable communication network, host computer and network adapter configurations can be used.

Some elements of network adapter 38, such as packet processing module 44, bus monitor 60 and congestion control module 64, may be implemented in hardware, e.g., in one or more Application-Specific Integrated Circuits (ASICs) or Field-Programmable Gate Arrays (FPGAs). Additionally or alternatively, some elements of network adapter 38, for example packet processing module 44, bus monitor 60 and/or congestion control module 64 can be implemented using software, or using a combination of hardware and software elements. Ingress queues 46 may be implemented using any suitable memory, such as a Random Access Memory (RAM).

In the context of the present patent application and in the claims, the term "circuitry" refers to all the elements of network adapter 38 excluding host interface 40. In FIG. 1, the circuitry comprises network interface 42, packet processing module 44, ingress queues 46, bus monitor 60 and congestion control module 64.

In some embodiments, some of the functions of the circuitry, e.g., one or more of packet processing module 44, bus monitor 60 and/or congestion control module 64, may be carried out by a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

Managing Congestion Based on Host Bus Performance

Figure 2:
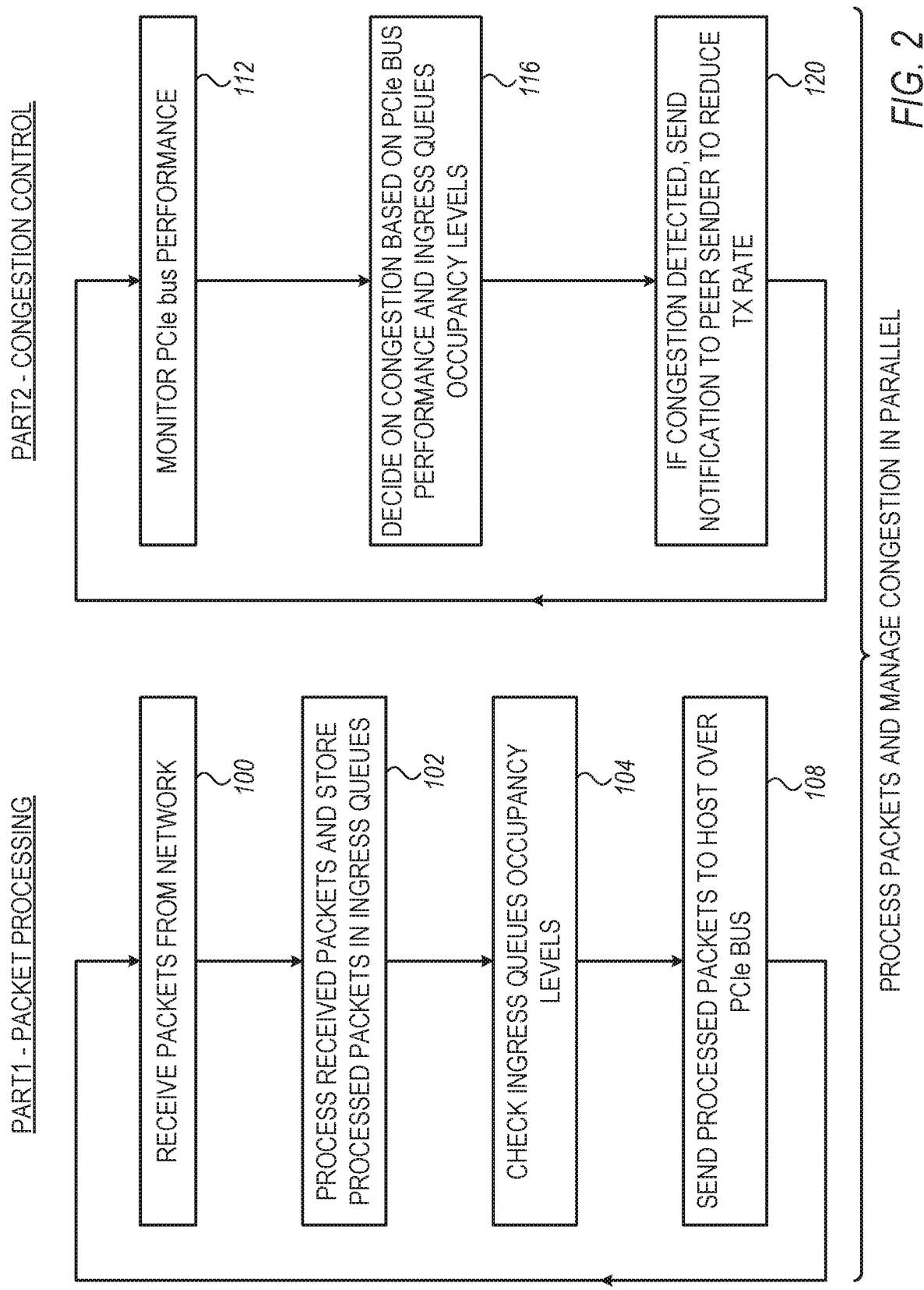
FIG. 2 is a flow chart that schematically illustrates a method for managing congestion based on host bus performance, in accordance with an embodiment that is described herein.

FIG. 2 is a flow chart that schematically illustrates a method for managing congestion based on host bus performance, in accordance with an embodiment that is described herein. The method will be described as being executed by various elements of network adapter 38.

The method of FIG. 2 is split into parts denoted PART1 and PART2, which may be carried out in parallel. PART1 mainly handles packet processing, whereas PART2 mainly handles congestion control.

PART1 of the method of FIG. 2 begins with packet processing module 44 receiving packets from communication network 30 via network interface 42, at a reception step 100. The received packets may belong to one or more flows. In the present context, a flow comprises a sequence of packets sent from a source node to a destination node. A flow may be defined, for example, by certain fields in the packet header such as source and destination addresses, port numbers and/or underlying protocol. The received flows destined to host computer 22 may all originate in a single source network node (e.g., one of host computers 24, 26 or 38 of FIG. 1.) Alternatively, at least some of the received flows originate in multiple different source network nodes (e.g., among host computers 24, 26 and 28 of FIG. 1.)

At a processing step 102, packet processing module 44 processes the received packets, and stores the processed packets in one or more ingress queues 46. The processing applied to a given packet and the ingress queue selected for the packet may depend on the flow to which the packet belongs. Example processing tasks that may be applied to the packets at step 102 comprise, checking that the destination address and IP header checksum are correct, performing a security check such as detecting a Denial of Service (DOS) attack, and performing a transport level check to verity that no packets have been dropped.

At an ingress queue checking step 104, packet processing module 44 checks the occupancy levels of ingress queues 46. In some embodiments, the packet processing module checks a separate occupancy level per each respective ingress queue, or per a group of one or more ingress queues. Alternatively, the packet processing module checks an occupancy level for all ingress queues 46 collectively. In yet other embodiments, the packet processing module checks separate overfilling states for different respective flows.

In some embodiments, the received packets are classified into different respective service classes or priorities. In such embodiments, the packet processing module evaluates occupancy levels for each respective service class or for each group of multiple service classes.

At a transmission step 108, packet processing module 44 scheduled the transmission of the packets queued in ingress queues 46 to the host via host interface 40 and over bus 36. In some embodiments, bus 36 comprises a PCIe bus, and the packet processing module sends packets to the host based on PCIe write credits signaled by the receiving party of the PCIe link. Following step 108 the method loops back to step 100, to receive subsequent packets from the communication network.

Note that in PART1 of FIG. 1, receiving packets from the communication network (at step 100) and transmitting processed packets to the host over PCIe (at step 108) are depicted as being executed serially, for the sake of clarity. In a practical implementation, however, the network adapter typically executes steps 100 and 108 in parallel. The network adapter may handle a queue for storing packets coming from the communication network and queued before being processed, and another queue for storing the packets processed by the packet processing module and pending transmission to the PCIe bus.

PART2 of the method of FIG. 2 begins with bus monitor 60 monitoring one or more performance attributes of bus 36, at a monitoring step 112. In some embodiments, bus monitor 60 evaluates an attribute comprising the latency of bus 36, as described above. In other embodiments, the performance attribute comprises the amount of PCIe credits available for writing towards the PCIe bus, as described above.

At a congestion decision step 116, congestion control module 64 decides on congestion based on (i) the occupancy levels of the ingress queues determined at step 104 and (ii) the bus performance attributes evaluated at step 112. In some embodiments, congestion control module 64 additionally decides on congestion based on congestion indication coming from the communication network, such as, for example, by detecting received packets that are marked with an Explicit Congestion Notification (ECN) indication. For example, the congestion control module calculates a weighted sum with suitable weights assigned to the occupancy levels and to the bus performance attribute(s), and decides of an imminent congestion when the weighted sum result exceeds a predefined decision threshold. Alternatively, any suitable function other than a weighted sum, to be applied to the occupancy levels and/or to the performance attributes, can also be used. Alternatively, an occupancy level that exceeds an occupancy threshold in one of the queues may produce a congestion indication.

At a congestion notification step 120, in case an imminent congestion was detected at step 116, the congestion control module sends a congestion notification to one or more source nodes in which the received packets originated (e.g., one or more of host computers 24, 26 and 28, in the present example). Scheduling the transmission of the congestion notification may be carried out in various ways. In one embodiment, for each packet whose storage in ingress queues 46 results in detecting an imminent congestion, the congestion control module (or the packet processing module) transmits a congestion notification to the source network node that has sent this packet. In another embodiment, the congestion control module sends a notification to a given source node only after a predefined time has elapsed since a previous notification was sent to the same source network node. In yet another embodiment, triggering the congestion notification is carried out by applying a suitable function to multiple measurements of a selected bus performance attribute. For example, this function may comprise a time-derivative function that evaluates the rate of change in the measured bus performance attribute. For example, in an embodiment, when the congestion control module identifies that the bus latency increases rapidly over multiple consecutive latency measurements, congestion is likely to occur, and the congestion control module sends a congestion notification to the relevant source.

In some embodiments, the congestion notification indicates the source causing the congestion, e.g., bus latency or lack of write credits. The congestion notification may indicate the severity level of the congestion, as determined by the bus performance attributes, e.g., a multibit value derived from the values of the bus performance attributes. In an example embodiment, the congestion notification comprises a recently monitored performance attribute value or a moving average result calculated over multiple recently monitored performance attribute values of the bus.

In terms of latency, a latency on the order of ten microseconds may indicate an imminent congestion state of a relatively light congestion level, e.g., due to the CPU and/or peripherals of the CPU being overloaded. A latency on the order of a hundred microseconds or more may indicate an imminent congestion state of a heavy congestion level, e.g., as a result of the CPU being in a sleep mode.

In some embodiments, congestion control module 64 uses one or more notification mechanisms supported by the underlying communication protocols. For example, the congestion control module generates the congestion notification in accordance with the transport protocol associated with the packet(s) that caused congestion.

In some embodiments, the congestion control module notifies congestion to the source node using a Congestion Notification Packet (CNP) of the RDMA over Converged Ethernet (RoCE) protocol, or using a Congestion Notification Message (CNM) or a Quantized Congestion Notification (QCN) CNM in InfiniBand. The congestion notification in the RoCE CNP and/or InfiniBand CNM may comprise a multibit indication of the congestion severity level. RoCE is specified, for example, in "Supplement to InfiniBand™ Architecture Specification, Volume 1, Release 1.2.1, Annex A16: RDMA over Converged Ethernet (RoCE)," InfiniBand Trade Association, Apr. 6, 2010.

In some embodiments, congestion control module 64 uses Negative Ack (NACK) messages produced by the responder RQ logic of a QP 54. In such embodiments, the congestion control module notifies congestion using a Receiver Not Ready (RNR) NACK message. RNR NACK messages may also be used for notifying congestion in RoCE. Note that RNR NACK is typically used in RoCE for indicating to the sender that a packet was dropped because of insufficient storage space in the receive buffers of the receiver. In the embodiment described above, the usage of the RNR NACK is extended to cause reaction to congestion.

In some embodiments, the underlying communication protocol comprises TCP, in which case the congestion control module uses the Echo-Explicit Congestion Notification (ECE) flag, and the congestion state is indicated by TCP Ack packets in which the ECE bit is set. A NACK-based notification may also be used in TCP for indicating to the source network node to stop injecting packets into the communication network until receiving a notification to resume transmission. This feature may be implemented, for example, by varying the receive window in the TCP header of the packets. The TCP receive window comprises a field in the TCP header that the receiver uses for indicating to the sender the amount of buffering space (e.g., in Bytes) available at the receiver for buffering incoming traffic. Setting this field to a zero value forces the sender to stop transmitting (until further notice or until some timer expiry at the sender side).

In some embodiments, communication network 30 comprises an IP network. In such embodiments, congestion control module 64 notifies congestion to the relevant source node using source quench messages of the Internet Control Message Protocol (ICMP). The ICMP is specified, for example, in Request for Comments (RFC) 792, September, 1981. The congestion control module directs the ICMP source quench message carrying the congestion notification to the source IP address of the originating packet.

The embodiments described above are given by way of example, and other suitable embodiments can also be used. For example, in some embodiments, the underlying transport protocol allows dropping packets when there is no available buffer space. In such embodiments, the congestion control module detects an imminent congestion (at step 116) well before packet dropping occurs. Also, in such embodiments, the network adapter may signal a packet drop event for indicating to the source node to reduce the rate of data injection into the network.

Although the embodiments described herein mainly address rate throttling by detecting congestion based on host bus performance, the methods and systems described herein can also be used in other applications, such as in adaptive load balancing between servers.

It will be appreciated that the embodiments described above are cited by way of example, and that the following claims are not limited to what has been particularly shown and described hereinabove. Rather, the scope includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A network adapter, comprising:
a host interface, configured to connect locally between the network adapter and a host via a local bus; and circuitry, configured to:
receive from one or more source nodes, over a communication network to which the network adapter is coupled, multiple packets destined to the host, and temporarily store the received packets in an ingress queue of the network adapter;
while sending the stored packets from the ingress queue to the host over the local bus, monitor a performance attribute of the local bus that is indicative of a rate of emptying the ingress queue toward the host; and
in response to detecting, based at least on the monitored performance attribute of the local bus, that congestion is expected to occur toward the communication network due to reduction in the emptying rate of the ingress queue toward the local bus, send a congestion notification to at least one of the source nodes from which the received packets originated.

2. The network adapter according to claim 1, wherein the performance attribute comprises a transaction latency between a time of sending a read request over the local bus and a time of receiving a response to the read request over the local bus, and wherein the circuitry is configured to detect that the congestion is expected to occur toward the communication network by identifying that the transaction latency exceeds a predefined latency limit.

3. The network adapter according to claim 1, wherein the local bus supports a credit-based flow control scheme, wherein the performance attribute comprises a credit level available for transmitting data toward the host over the local bus, and wherein the circuitry is configured to detect that the congestion is expected to occur toward the communication network by identifying that the credit level is below a predefined credit threshold.

4. The network adapter according to claim 1, wherein the received packets belong to multiple different respective service classes, and wherein the circuitry is configured to detect that the congestion is expected to occur toward the communication network for a selected service class.

5. The network adapter according to claim 1, wherein the circuitry is configured to detect that the congestion is expected to occur toward the communication network based on evaluating a rate of change of the performance attribute.

6. The network adapter according to claim 1, wherein the circuitry is configured to send the congestion notification by generating a multibit notification that indicates a severity level of the performance attribute.

7. The network adapter according to claim 1, wherein the circuitry is configured to initially store the received packets in a receive buffer of the network adapter, to process at least some of the packets in the receive buffer before transferring the received packets to the ingress queue, and to detect that the congestion is expected to occur toward the communication network based on respective occupancy levels of at least one of the ingress queue and the receive buffer, and on the monitored performance attribute.

8. The network adapter according to claim 1, wherein the circuitry is configured to send the congestion notification using a notification packet supported by an underlying transport layer protocol.

9. The network adapter according to claim 1, wherein the circuitry is configured to send the congestion notification to a given source network node only when a predefined time period has elapsed since a congestion notification was previously sent to the given source network node.

10. A method, comprising:
in a network adapter comprising a host interface for connecting locally between the network adapter and a host via a local bus, receiving from one or more source nodes, over a communication network to which the network adapter is coupled, multiple packets destined to the host, and temporarily storing the received packets in an ingress queue of the network adapter;
while sending the stored packets from the queue to the host over the bus, monitoring a performance attribute of the local bus that is indicative of a rate of emptying the ingress queue toward the host; and
in response to detecting, based at least on the monitored performance attribute of the local bus, that congestion is expected to occur toward the communication network due to reduction in the emptying rate of the ingress queue toward the local bus, sending a congestion notification to at least one of the source nodes from which the received packets originated.

11. The method according to claim 10, wherein the performance attribute comprises a transaction latency between a time of sending a read request over the local bus and a time of receiving a response to the read request over the local bus, wherein detecting that the congestion is expected to occur toward the communication network comprises identifying that the transaction latency exceeds a predefined latency limit.

12. The method according to claim 10, wherein the local bus supports a credit-based flow control scheme, wherein the performance attribute comprises a credit level available for transmitting data toward the host over the local bus, and wherein detecting that the congestion is expected to occur toward the communication network comprises identifying that the credit level is below a predefined credit threshold.

13. The method according to claim 10, wherein the received packets belong to multiple different respective service classes, wherein detecting that the congestion is expected to occur toward the communication network comprises detecting that the congestion is expected to occur toward the communication network for a selected service class.

14. The method according to claim 10, wherein that the congestion is expected to occur toward the communication network comprises evaluating a rate of change of the performance attribute.

15. The method according to claim 10, wherein sending the congestion notification comprises generating a multibit notification that indicates a severity level of the performance attribute.

16. The method according to claim 10, and comprising initially storing the received packets in a receive buffer of the network adapter and processing at least some of the packets in the receive buffer before transferring the received packets to the ingress queue, wherein detecting that the congestion is expected to occur toward the communication network comprises that the congestion is expected to occur toward the communication network based on respective occupancy levels of at least one of the ingress queue and the receive buffer, and on the monitored performance attribute.

17. The method according to claim 10, wherein sending the congestion notification comprises sending the congestion notification using a notification packet supported by an underlying transport layer protocol.

18. The method to claim 10, wherein sending the congestion notification comprises sending the congestion notification to a given source network node only when a predefined time period has elapsed since a congestion notification was previously sent to the given source network node.

* * * * *